(12) United States Patent
Alladi et al.

(10) Patent No.: US 11,916,971 B2
(45) Date of Patent: Feb. 27, 2024

(54) UPDATING SECURITY RULE SETS USING REPOSITORY SWITCHING

(71) Applicant: Capital One Services, LLC, McLean, VA (US)

(72) Inventors: Srinivas Alladi, Glen Allen, VA (US); Muthukumar Kubendran, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 263 days.

(21) Appl. No.: 17/590,544

(22) Filed: Feb. 1, 2022

(65) Prior Publication Data

US 2023/0247061 A1 Aug. 3, 2023

(51) Int. Cl.
*H04L 9/40* (2022.01)
(52) U.S. Cl.
CPC .................. *H04L 63/205* (2013.01)
(58) Field of Classification Search
CPC .... H04L 63/205; H04L 63/0263; H04L 63/20
See application file for complete search history.

(56) References Cited

U.S. PATENT DOCUMENTS

| | | | | |
|---|---|---|---|---|
| 8,463,727 B2* | 6/2013 | Nagoya | ............... | H04L 63/0263 706/47 |
| 9,600,661 B2* | 3/2017 | Safa | ................ | G06F 21/52 |
| 9,825,995 B1* | 11/2017 | Schroeder | ............. | H04L 63/205 |
| 10,601,848 B1* | 3/2020 | Jeyaraman | .......... | H04L 63/1416 |
| 11,316,900 B1* | 4/2022 | Schottland | .......... | H04L 63/0263 |
| 2011/0093299 A1* | 4/2011 | Stepeck | ................ | G06Q 40/08 705/4 |
| 2016/0080972 A1* | 3/2016 | Ni | ........................ | H04W 76/12 370/229 |
| 2016/0156646 A1* | 6/2016 | Hsueh | .................... | G06N 20/00 726/1 |
| 2016/0337441 A1* | 11/2016 | Bloomquist | ........... | G06Q 10/10 |
| 2017/0147245 A1* | 5/2017 | Safa | ...................... | H04L 63/101 |
| 2018/0067983 A1* | 3/2018 | Esaki | ...................... | H04L 67/01 |
| 2021/0385138 A1* | 12/2021 | Watson | ................... | H04L 41/40 |
| 2023/0060207 A1* | 3/2023 | Sirineni | ................. | H04L 69/22 |
| 2023/0247061 A1* | 8/2023 | Alladi | ................. | H04L 63/0263 726/1 |

* cited by examiner

*Primary Examiner* — Gary S Gracia
(74) *Attorney, Agent, or Firm* — Perkins Coie LLP

(57) ABSTRACT

Methods and systems are described herein for updating cybersecurity enforcement rules in real-time over disparate computer networks. A rule enforcement system may receive a real-time data stream. The real-time data stream may include real-time communications requiring cybersecurity verification. Real-time data communications are processed through a first rule repository. In response to determining that rule updates to rules within the first rule repository are available, a second rule repository is retrieved and brought online. Previously received real-time communication data is processed with the first rule repository and new real-time communication data is routed to the second rule repository. When previously received real-time communication data has been processed, the first rule repository is disabled.

20 Claims, 6 Drawing Sheets

| Rule ID | Rule Content | Rule Dependencies |
|---|---|---|
| 1 | Location = 40.9404° N, 74.1318° W Range of Location 100 miles | Null |
| 2 | Amount = < limit | Null |
| 3 | <Rule Data> | 1 |
| 4 | <Rule Data> | Null |
| 5 | <Rule Data> | Null |

FIG. 2

| Criterion ID | Criterion Type | Criterion Definition |
|---|---|---|
| 1 | Time | Every Hour |
| 2 | On-Demand | Cybersecurity Incident |
| 3 | <Type Data> | <Definition Data> |

FIG. 3

UPDATING SECURITY RULE SETS USING REPOSITORY SWITCHING

BACKGROUND

Currently, enterprises face a plethora of cybersecurity incidents. Those incidents may involve various bad actors attempting to defeat an enterprise's security. In some instances, bad actors are successful at defeating the enterprise's security, which may have adverse effects on the enterprise itself. To prevent bad actors from causing damage, enterprises generate rules for accessing computer systems. Many rulesets include cybersecurity rules that are intertwined. Thus, updating a single cybersecurity rule may break a whole cybersecurity scheme. Furthermore, taking a particular computing system offline to update cybersecurity rules may not be acceptable. Thus, a mechanism is needed to update cybersecurity rules within a computing system while the system is online using those cybersecurity rules.

SUMMARY

Methods and systems are described herein for updating cybersecurity enforcement rules in real-time over disparate computer networks. A rule enforcement system may be used to update cybersecurity enforcement rules. For example, a routine may be built into the rule enforcement system to update the cybersecurity rules. The rule enforcement system may receive a real-time data stream. The real-time data stream may include real-time communications requiring cybersecurity verification. For example, the real-time communications may include server requests for particular data. The real-time data stream may include a near-continuous series of real-time communications. That is, the server requests may be received continuously and may require real-time processing.

The rule enforcement system may process the real-time data stream through a first rule repository. The first rule repository may include a complete rule set for addressing known cybersecurity incidents. For example, the first rule repository may include cybersecurity rules with interdependencies. Thus, the rule enforcement system may retrieve the rules from the first rule repository and apply those rules to the real-time data stream. For example, the real-time data stream may include a plurality of data requests from one or more servers and the rule enforcement system may apply the rules from the first repository to the data requests. In some embodiments, the rules may require that the requests be from a particular location and/or that the requests be associated with a particular value.

In some embodiments, the rule enforcement system may query a remote data source for rule updates based on a first criterion. For example, the first criterion may be time-based. Thus, the rule enforcement system may query the remote data source every five minutes, every 2 hours, or at another suitable interval. In some embodiments, the rule enforcement system may determine that a criterion for querying for a rule update has been met and query a remote data source for the rule update based on the criterion. For example, the rule enforcement system may transmit, to the remote data source, a request that includes a command to return any available rule updates. In response, the remote data source may return data indicating that a rule update is available or is not available. Thus, the rule enforcement system may determine, based on the results of querying the remote data source, that the rule update is available. For example, the response from the remote data source may include a Boolean value indicating that an update is available.

In some embodiments, the rule enforcement system may use the following operations to determine whether a criterion for a rule update has been met. The rule enforcement system may determine whether a size of an incoming request of a plurality of incoming requests has exceeded a size threshold. For example, the rule enforcement system may have a size threshold input by a user, or the size threshold may be generated automatically based on an average request size. For example, the size threshold may be set to two deviations higher than an average request. In some embodiments, the size of the request may refer to a value within the request.

In some embodiments, the rule enforcement system may determine whether a volume of the plurality of incoming requests has exceeded a volume threshold. For example, the rule enforcement system may receive a certain number of requests per minute, per hour, etc. Thus, the rule enforcement system may have a set threshold of a certain number of requests per minute, per hour, etc. The threshold may be set by a user or may be automatically generated based on the volume of the requests. The rule enforcement system may set the threshold to a number that is two deviations higher than the average volume. Based on determining that the size of the incoming request has exceeded the size threshold or that the volume of the plurality of incoming requests has exceeded the volume threshold, the rule enforcement system may determine that the criterion for querying the rule update has been met.

In some embodiments, the rule enforcement system may determine that the criterion for querying the rule update has been met based on a rate of change of incoming requests. The rule enforcement system may determine that a rate of change of incoming requests has exceeded a rate threshold. For example, the rule enforcement system may determine that a change in volume between a first hour and a second hour was 10%. Furthermore, the rule enforcement system may determine that a change in volume between the second hour and the third hour is 90%. Thus, the rule enforcement system may determine that a 90% rate of change exceeds a threshold. The threshold may be 15%, 20%, or another suitable percentage change. Based on determining that the rate of change of incoming requests has exceeded the rate threshold, the rule enforcement system may determine that the criterion for querying the rule update has been met.

In response to the query, the remote data source may transmit a response indicating that rule updates are available. For example, the remote data source may send a Boolean variable or another suitable indicator to indicate that the rule update is available. In response to determining that rule updates to rules within the first rule repository are available, the rule enforcement system may retrieve a second rule repository. The second rule repository may include a revised complete rule set for addressing the known cybersecurity incidents. The second rule repository may be a complete replacement for the first rule repository.

While the second rule repository is being retrieved, the rule enforcement system may continue to apply rules from the first rule repository to incoming requests. When the second rule repository is received, it may be prepared for use. Thus, based on completion of retrieval of the second rule repository, the rule enforcement system may perform the following operations to switch the first rule repository with the second rule repository. The rule enforcement system may then bring the second rule repository online.

The rule enforcement system may process previously received real-time communication data with the first rule repository and may route new real-time communication data to the second rule repository. That is, at a particular time, the rule enforcement system may cut off requests from being sent to the first rule repository and may send those requests to the second rule repository (e.g., apply the rules in the second rule repository instead of the rules in the first rule repository). The rule enforcement system may determine that the previously received real-time communication data has been processed. For example, the rule enforcement system may keep track of all requests in a queue for the first rule repository and may process those requests by applying the rules within the first rule repository to those requests. When the queue is empty, the rule enforcement system may determine that the previously received real-time communication data has been processed. In response to determining that the previously received real-time communication data has been processed, the rule enforcement system may disable the first rule repository.

Various other aspects, features, and advantages of the system will be apparent through the detailed description and the drawings attached hereto. It is also to be understood that both the foregoing general description and the following detailed description are examples and are not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates a table representing a portion of a rule repository, in accordance with one or more embodiments of this disclosure.

FIG. 3 illustrates a criterion table, in accordance with one or more embodiments.

DETAILED DESCRIPTION OF THE DRAWINGS

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
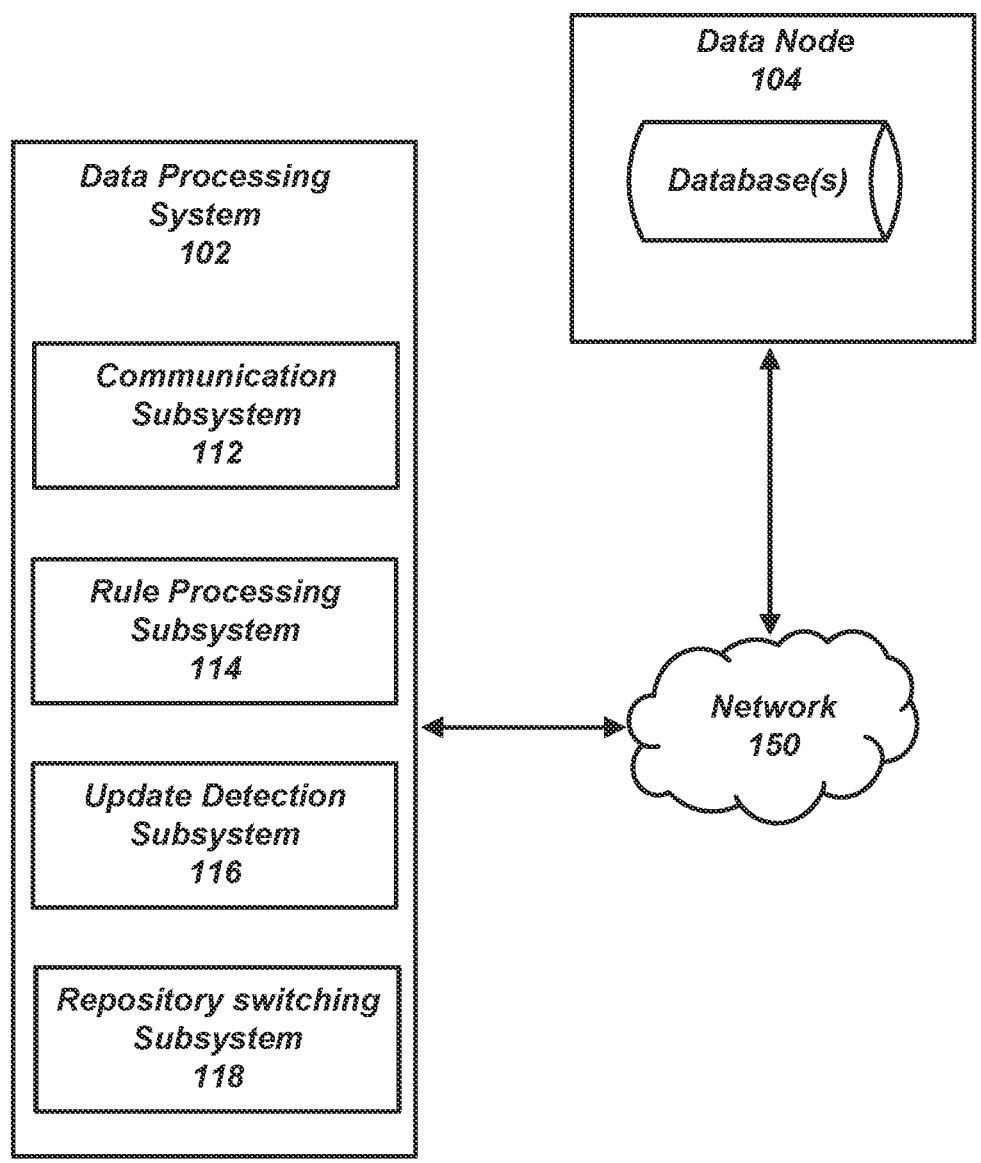
FIG. 1 shows an illustrative system for updating cybersecurity enforcement rules in real-time over disparate computer networks, in accordance with one or more embodiments of this disclosure.

FIG. 1 shows environment 100, which includes a system for updating cybersecurity enforcement rules in real-time over disparate computer networks. Environment 100 includes data processing system 102, data node 104, and computing devices 108a-108n. Data processing system 102 may execute instructions for updating cybersecurity enforcement rules in real-time over disparate computer networks. Data processing system 102 may include software, hardware, or a combination of the two. For example, data processing system 102 may be a physical server or a virtual server that is running on a physical computer system.

Data node 104 may store various data, including different rule repositories, and may enable rule repository design. In some embodiments, data node 104 may store older rule repositories that have been decommissioned and/or disabled. Data node 104 may include software, hardware, or a combination of the two. For example, data node 104 may be a physical server, or a virtual server that is running on a physical computer system. Network 150 may be a local area network, a wide area network (e.g., the Internet), or a combination of the two. Computing devices 108a-108n may be end-user computing devices (e.g., desktop computers, laptops, electronic tablets, point of sale systems, and/or other computing devices used by end users).

Data processing system 102 may receive a real-time data stream, with the real-time data stream comprising real-time communications requiring cybersecurity verification. Data processing system 102 may receive the real-time data stream using communication subsystem 112. In some embodiments, the real-time data stream may be a stream of data requests. In some embodiments, the real-time data stream may include a near-continuous series of real-time communications requiring cybersecurity verification. For example, data processing system 102 may receive the real-time data stream, which may include data from any of computing devices 108a-108n and/or from a data node 104. Data processing system 102 may receive the real-time data stream using communication subsystem 112. Communication subsystem 112 may include software components, hardware components, or a combination of both. For example, communication subsystem 112 may include a network card (e.g., a wireless network card and/or a wired network card) that is coupled with software to drive the card.

Communication subsystem 112 may store the real-time data stream in memory in preparation for other operations. Communication subsystem 112 may split the real time data stream into requests and store a data structure for each request. Communication subsystem 112 may pass the real-time data stream, or a pointer to the real-time data stream in memory, to rule processing subsystem 114. Rule processing subsystem 114 may include software components, hardware components, or a combination of both. For example, rule processing subsystem 114 may include software components that access rule repositories in memory and/or storage and may use a processor to perform its operations.

Rule processing subsystem 114 may process the real-time data stream through a first rule repository. The first rule repository may be a complete rule set for addressing known cybersecurity incidents. FIG. 2 illustrates a table 200 representing a portion of a rule repository, in accordance with one or more embodiments of this disclosure. Column 203 may store rule identifiers. Rule identifiers may be numbers, strings, hexadecimal numbers, and/or other suitable identifiers. Column 206 may store rule content. For example, rule content may be associated with location, amount, etc. Column 209 may store rule dependencies. For example, if a particular rule is dependent on results of another rule, column 209 may store that dependency.

In some embodiments, rule processing subsystem 114 may query a remote data source for rule updates based on a criterion. For example, rule processing subsystem 114 may use communication subsystem 112 to query data node 104 for rule updates. In some embodiments, the query may include an identifier of a rule repository for which updates are being requested. Thus, the remote data source (e.g., data node 104) may use the identifier for the rule repository to search for any available updates. In some embodiments, the request may also include the version of the rule repository. Thus, the remote data source may use the identifier of the rule repository and the version to search for any new versions of the rule repository that are available. For example, the request may be a database query.

In some embodiments, rule processing subsystem 114 may determine whether the criterion for querying the rule update has been met based on sizes and/or volume of the incoming requests. Thus, rule processing subsystem 114 may determine whether a size of an incoming request of a plurality of incoming requests has exceeded a size threshold. For example, as requests within the real-time data stream are received, rule processing subsystem 114 may determine the size of those requests. Furthermore, rule processing subsystem 114 may store a size threshold, for example, in memory and/or on a storage device. Thus, rule processing subsystem 114 may retrieve the size threshold from memory or the storage device and may compare the size threshold with the size of the request. The size threshold may be entered by a user prior to processing any real-time data streams and may be updated as the processing is performed. In some embodiments, rule processing subsystem 114 may determine the size threshold. For example, rule processing subsystem 114 may store the size of requests as they are received for a time period (e.g., for an hour, a day, a week, or another suitable time period). Rule processing subsystem 114 may then calculate an average size of the requests. Based on the average size of the requests for a particular time period, rule processing subsystem 114 may generate a size threshold. For example, rule processing subsystem 114 may generate a size threshold that is two deviations higher than the average request size.

In some embodiments, rule processing subsystem 114 may use a volume of the requests received in the real-time data stream as the criterion. For example, rule processing subsystem 114 may store a count of the requests and/or total size of the requests for a particular time interval. Thus, rule processing subsystem 114 may determine whether a volume of the plurality of incoming requests has exceeded a volume threshold. The threshold may be input by a user or operator of the system and may be stored in memory. Thus, based on determining that the size of the incoming request has exceeded the size threshold or that the volume of the plurality of incoming requests has exceeded the volume threshold, rule processing subsystem 114 may determine that the criterion for querying the rule update has been met.

In some embodiments, rule processing subsystem 114 may determine that a rate of change of incoming requests has exceeded a rate threshold. For example, the rule enforcement system may determine that a change in volume between a first hour and a second hour was 10%. Furthermore, the rule enforcement system may determine that a change in volume between the second hour and the third hour is 90%. Thus, the rule enforcement system may determine that the 90% rate of change exceeds a threshold. The threshold may be 15%, 20%, or another suitable percentage change. Based on determining that the rate of change of incoming requests has exceeded the rate threshold, rule processing subsystem 114 may determine that the criterion for querying the rule update has been met.

FIG. 3 illustrates a criterion table 300. Column 303 illustrates a criterion identifier. A criterion identifier may be a number, a string, a hexadecimal number, or another suitable identifier. Column 306 illustrates a criterion type. A criterion type may indicate when the criterion is to be applied. For example, if a criterion type is "time," then the criterion may be applied with a particular frequency (e.g., every hour). If the criterion type is "on demand," the criterion may be applied at any time (e.g., when the system determines a rule update is needed or when a cybersecurity incident is detected). Column 309 stores criterion definitions. Criterion definitions may be different based on criterion types. For example, a time criterion type may have a frequency of application (e.g., one hour) as a criterion definition. An on-demand criterion type may have a criterion definition of a cyber security incident. Rule processing subsystem 114 may pass an indication that a determination has been made for querying for a rule update to update detection subsystem 116.

Update detection subsystem 116 may include software components, hardware components, or a combination of both. For example, update detection subsystem 116 may include software components that access the document in memory and/or storage and may use one or more processors to perform its operations. In some embodiments, update detection subsystem 116 may determine, based on results of querying the remote data source, that the rule updates are available. For example, update detection subsystem 116 may receive, in response to the query (e.g., a query that includes a repository identifier), a latest rule repository version associated with a particular rule repository. The received rule repository may have an associated version identifier. Update detection subsystem 116 may compare the version and determine whether the received rule repository is of a new version rather than an existing rule repository. In some embodiments, update detection subsystem 116 may receive a version identifier associated with the rule repository instead of the rule repository itself.

In response to determining that rule updates to rules within the first rule repository are available, update detection subsystem 116 may retrieve a second rule repository. The second rule repository may include a revised complete rule set for addressing known cybersecurity incidents. For example, update detection subsystem 116 may initiate a download of the second rule repository. Update detection subsystem 116 may send a notification to repository switching subsystem 118 that a new rule repository is being received (e.g., being downloaded). In some embodiments, update detection subsystem 116 may send a notification to repository switching subsystem 118 when the download is complete.

Repository switching subsystem 118 may include software components, hardware components, or a combination of both. For example, repository switching subsystem 118 may have a software component for switching from a first repository to a second repository and may use one or more processors and/or memory to perform the switching. Repository switching subsystem 118 may need to wait until the second repository is downloaded before being able to bring it online, as a complete repository is needed before that repository can be operational.

Based on completion of retrieval of the second rule repository, repository switching subsystem 118 may bring the second rule repository online. In some embodiments, prior to bringing online the second rule repository, repository switching subsystem 118 may authenticate the second rule repository using metadata associated with the second rule repository. For example, the metadata may include a cryptographic signature or an identifier of a user that created the second rule repository. Based on the cryptographic signature and/or the identifier of the user, repository switching subsystem 118 may authenticate the second rule repository. In some embodiments, repository switching subsystem 118 may store a list of users allowed to create new rule repositories and/or new versions of a particular rule repository. Thus, repository switching subsystem 118 may verify the signature using public/private keys of the users allowed to generate the rule repositories.

In some embodiments, prior to bringing online the second rule repository, repository switching subsystem 118 may test the second rule repository. Repository switching subsystem 118 may use the rules within the second rule repository on one or more synthetic requests. Repository switching subsystem 118 may receive a result of the synthetic transactions and determine whether the result matches the expected results. Thus, repository switching subsystem 118 may validate the second rule repository based on processing by the second rule repository of the one or more synthetic requests. In some embodiments, repository switching subsystem 118 may validate the second rule repository by processing copies of the incoming transactions using the second rule repository and comparing the results of the transactions to results of these transactions when the rules of the first rule repository are applied.

In some embodiments, repository switching subsystem 118 may monitor the newly enabled rule repository for proper operation. Thus, repository switching subsystem 118 may determine that a number of requests rejected based on processing the real-time communication data using the second rule repository exceeds a threshold. For example, the rejection rate of real-time communications may have been 1% when processed using the first rule repository. However, the rejection rate of new real-time communications that are being processed by the second rule repository is 20%. Thus, repository switching subsystem 118 may determine that there is an issue with the second rule repository. In response to determining that the number of requests rejected based on processing the real-time communication data using the second rule repository exceeds the threshold, repository switching subsystem 118 may perform a roll-back operation to the first rule repository. For example, repository switching subsystem 118 may process all new real-time communications using the first rule repository and then finish processing all the real-time communications that have been added to the queue for the second rule repository.

Figure 4:
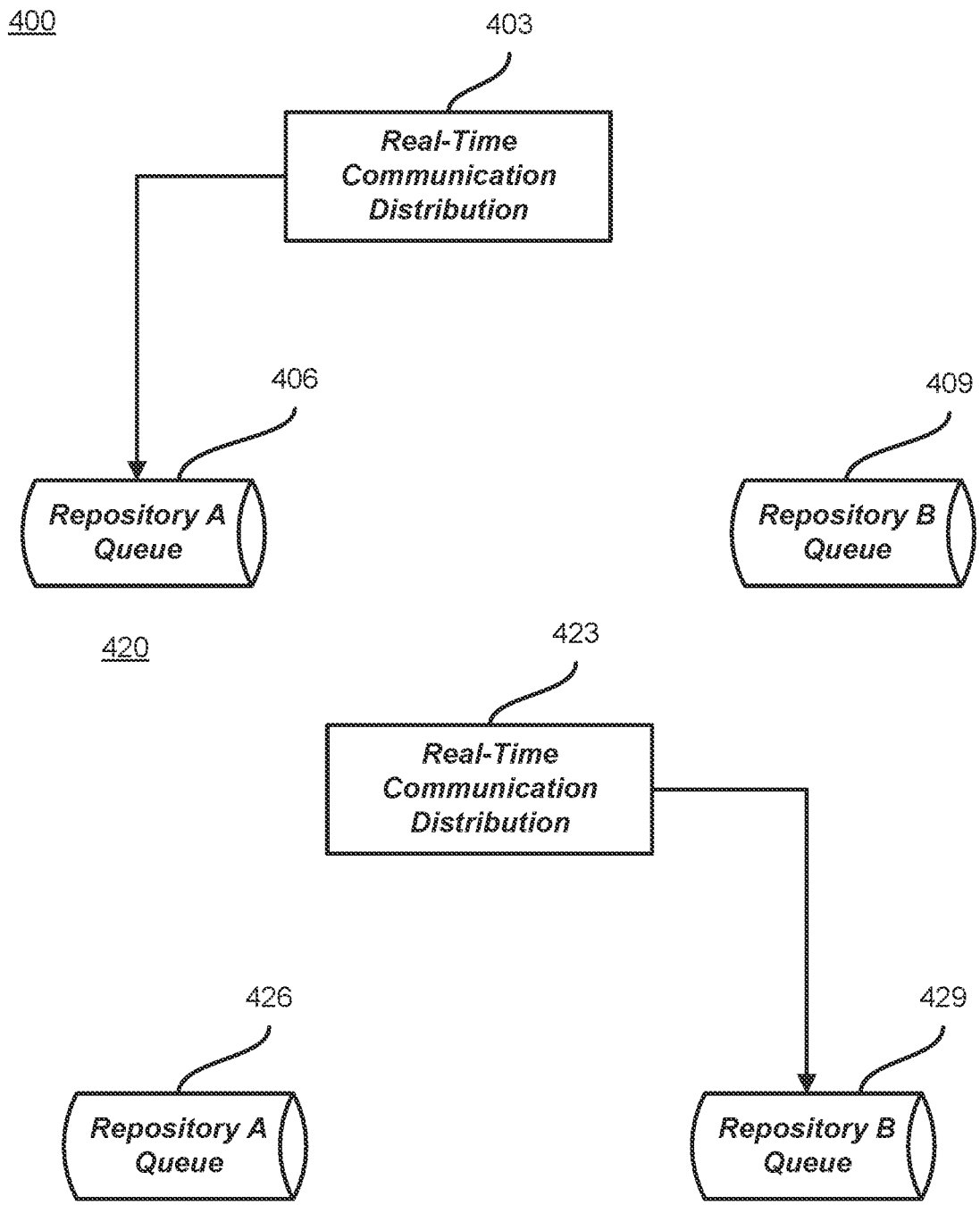
FIG. 4 illustrates switching data distribution from a first rule repository to a second rule repository, in accordance with one or more embodiments.

FIG. 4 illustrates switching diagrams 400 and 420 for switching data distribution from a first rule repository to a second rule repository. Diagram 400 illustrates a first state of the system. Real-time communication distribution component 403 may be sending requests received as real-time data communications to Repository A Queue 406. Repository A Queue 406 may store requests that are to be processed using the first rule repository. In this state, the system has not been switched over to using the rules of the second repository. Thus, Repository B Queue 409 does not have any requests being sent to it.

Diagram 420 illustrates a state of the system when rule processing has been switched from the first rule repository to a second rule repository. Thus, in this state, Real-Time Communication Distribution system 423 may send all new requests to Repository B Queue 429. Thus, no new requests are sent to Repository A Queue 426. However, Repository A Queue 426 may still process the requests in the queue before shutting down. Thus, repository switching subsystem 118 may indicate to rule processing subsystem 114 to use the second rule repository. However, rule processing subsystem 114 may process previously received real-time communication data with the first rule repository. For example, every request that has been added to Repository A Queue 426 may be processed by rule processing subsystem 114 using the first rule repository.

Based on the indication from repository switching subsystem 118, rule processing subsystem 114 may route new real-time communication data to the second rule repository. For example, if there are 45 requests in the queue associated with the first rule repository, rule processing subsystem 114 may process those requests using the first rule repository. Rule processing subsystem 114 may determine that the previously received real-time communication data has been processed. For example, rule processing subsystem 114 may monitor the number of requests in the queue and determine when the queue reaches zero requests. At that point, rule processing subsystem 114 may send a notification to repository switching subsystem 118 that all requests have been processed. In response to determining that the previously received real-time communication data has been processed, repository switching subsystem 118 may disable the first rule repository. For example, repository switching subsystem 118 may mark the first rule repository with a disabled flag. In some embodiments, repository switching subsystem 118 may remove the first rule repository from the system. In some embodiments, the removal operation may be performed after the second rule repository has been authenticated and tested. In yet some other embodiments, the removal operation may be performed after a particular time. For example, repository switching subsystem 118 may monitor the second rule repository for a time period (e.g., as described above for rejection rates of requests). After the time period, repository switching subsystem 118 may remove the first repository from the system. Thus, if the rejection rate of requests does not meet a threshold, the first repository may be removed from the system.

In some embodiments, rule processing subsystem 114 may detect a new cybersecurity incident. For example, rule processing subsystem 114 may detect a large number of invalid requests within the real-time data communications. Thus, rule processing subsystem 114 may generate a third rule repository based on the new cybersecurity incident. For example, the third rule repository may be a rule blocking all requests that are larger than a certain size. The third rule repository may be a temporary rule repository to be used while a new rule repository is generated. Furthermore, rule processing subsystem 114 may transmit a notification of the cybersecurity incident to one or more users enabled to create new rule repository and may start monitoring for new rule repositories with an increased frequency. For example, if rule processing subsystem 114 generally checks for new rules repositories every 60 minutes, the time interval may be changed to 1 minute (e.g., 60 times more frequently).

Computing Environment

Figure 5:
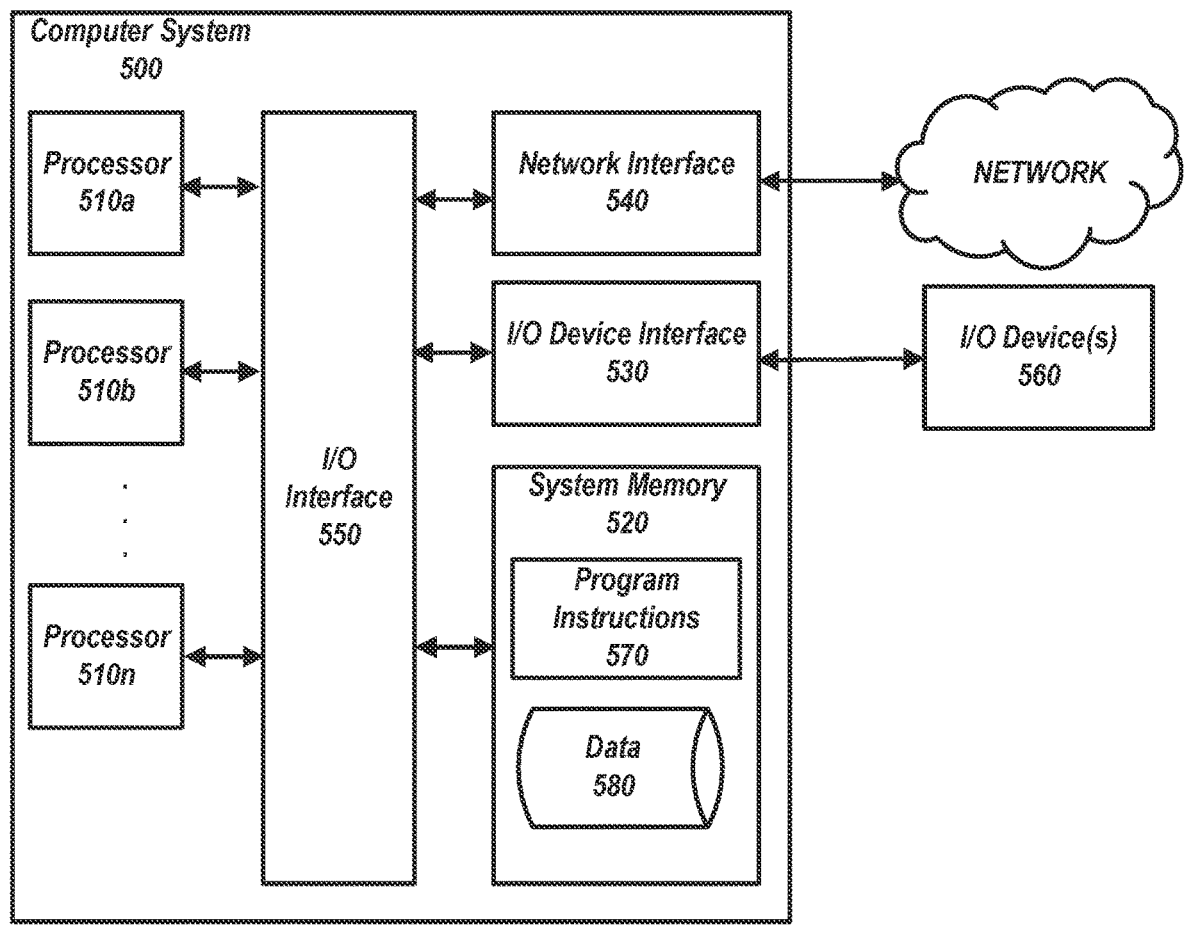
FIG. 5 shows an example computing system that may be used in accordance with one or more embodiments.

FIG. 5 shows an example computing system that may be used in accordance with some embodiments of this disclosure. In some instances, computing system 500 is referred to as a computer system. A person skilled in the art would understand that those terms may be used interchangeably. The components of FIG. 5 may be used to perform some or all operations discussed in relation with FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage media may include non-volatile memory (e.g., flash memory, ROM, PROM, EPROM, EEPROM memory), volatile memory (e.g., random access memory (RAM), static RAM (SRAM), synchronous dynamic RAM (SDRAM)), bulk storage memory (e.g., CD-ROM and/or DVD-ROM, hard-drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500, or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated, or it may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 6:
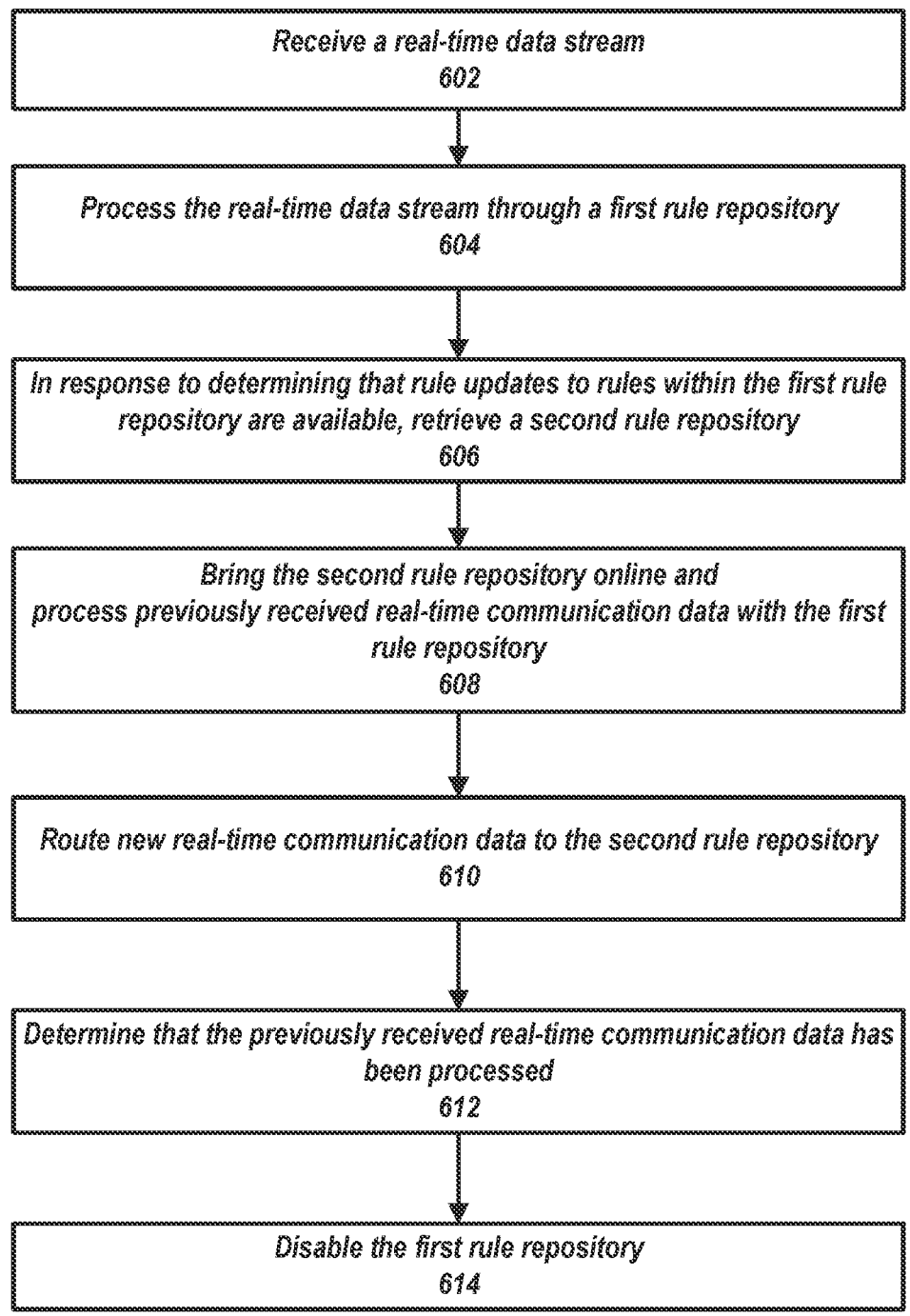
FIG. 6 is a flowchart of operations for updating cybersecurity enforcement rules in real-time over disparate computer networks, in accordance with one or more embodiments.

FIG. 6 is a flowchart 600 of operations for updating cybersecurity enforcement rules in real time over disparate computer networks. The operations of FIG. 6 may use components described in relation to FIG. 5. In some embodiments, data processing system 102 may include one or more components of computer system 500. At 602, data processing system 102 may receive a real-time data stream. For example, data processing system 102 may receive the real-time data stream from a data node 104, from one of computing devices 108*a*-108*n*, and/or from other data sources. Data processing system 102 may receive the real-time data stream over network 150 using network interface 540.

At 604, data processing system 102 may process the real-time data stream through a first rule repository. The first rule repository may include a complete rule set for addressing known cybersecurity incidents. Data processing system 102 may use one or more processors 510*a*, 510*b*, and/or 510*n*. At 606, data processing system 102, in response to determining that rule updates to rules within the first rule repository are available, retrieves a second rule repository. For example, data processing system 102 may, using one or more processors 510*a*-510*n*, retrieve the second rule repository. Data processing system 102 may retrieve the second rule repository from using network interface 540 through a network (e.g., network 150). At 608, data processing system 102 brings the second rule repository online and processes previously received real-time communication data with the first rule repository. Data processing system 102 may use one or more processors 510*a*, 510*b*, and/or 510*n* to perform these operations.

At 610, data processing system 102 may route new real-time communication data to the second rule repository. Data processing system 102 may use one or more processors 510*a*, 510*b*, and/or 510*n* to route the new real-time communications through I/O interface 550. At 612, data processing system 102 determines that the previously received real-time communication data has been processed. Data processing system 102 may use one or more processors (e.g., processor 510*a*) to perform the determination. At 614, data processing system 102 disables the first rule repository. For example, data processing system 102 may use one or more processors (e.g., processor 510*a*, 510*b*, and or 510*n*) to perform the operation.

Although the present invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for updating cybersecurity enforcement rules in real-time over disparate computer networks, the method comprising: receiving a real-time data stream, the real-time data stream comprising real-time communications requiring cybersecurity verification; processing the real-time data stream through a first rule repository, wherein the first rule repository comprises a complete rule set for addressing known cybersecurity incidents; in response to determining that rule updates to rules within the first rule repository are available, retrieving a second rule repository, wherein the second rule repository comprises a revised complete rule set for addressing the known cybersecurity incidents; based on completion of retrieval of the second rule repository: bringing the second rule repository online; processing previously received real-time communication data with the first rule repository; and routing new real-time communication data to the second rule repository; determining that the previously received real-time communication data has been processed; and in response to determining that the previously received real-time communication data has been processed, disabling the first rule repository.

2. Any of the preceding embodiments, further comprising prior to bringing online the second rule repository, authenticating the second rule repository using metadata associated with the second rule repository.

3. Any of the proceeding embodiments, further comprising prior to bringing online the second rule repository: transmitting one or more synthetic requests to the second rule repository; and validating the second rule repository based on responses from the second rule repository to the one or more synthetic requests.

4. Any of the preceding embodiments, further comprising determining, that a number of requests rejected based on processing the real-time communication data using the second rule repository exceeds a threshold; and in response to determining that the number of requests rejected based on processing the real-time communication data using the second rule repository exceeds the threshold, performing a roll-back operation to the first rule repository.

5. Any of the preceding embodiments, further comprising determining that a criterion for querying for a rule update has been met; querying a remote data source for the rule update based on the criterion; and determining, based on results of querying the remote data source, that the rule update is available.

6. Any of the preceding embodiments, wherein determining that the criterion for querying the rule update has been met: determining whether a size of an incoming request of a plurality of incoming requests has exceeded a size threshold; determining whether a volume of the plurality of incoming requests has exceeded a volume threshold; and based on determining that the size of the incoming request has exceeded the size threshold or the volume of the plurality of incoming requests has exceeded the volume threshold, determining that the criterion for querying the rule update has been met.

7. Any of the preceding embodiments, wherein determining that the criterion for querying the rule update has been met: determining that a rate of change of incoming requests has exceeded a rate threshold; and based on determining that the rate of change of incoming requests has exceeded the rate threshold, determining that the criterion for querying the rule update has been met.

8. Any of the preceding embodiments, further comprising: detecting a new cybersecurity incident; and generating a third rule repository based on the new cybersecurity incident.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for updating cybersecurity enforcement rules in real-time over disparate computer networks, the system comprising:
one or more processors; and
a non-transitory, computer-readable storage medium storing instructions, which when executed by the one or more processors cause the one or more processors to perform operations comprising:
receiving a real-time data stream, the real-time data stream comprising a near-continuous series of real-time communications requiring cybersecurity verification;
routing the real-time data stream to a first queue associated with a first rule repository, wherein the first rule repository comprises a complete rule set for addressing known cybersecurity incidents, and wherein the near-continuous series of real-time communications is processed using the first rule repository;
querying a remote data source for rule updates based on a first criterion;
determining, based on results of querying the remote data source, that the rule updates are available;
in response to determining that the rule updates are available, retrieving a second rule repository, wherein the second rule repository comprises a revised complete rule set for addressing the known cybersecurity incidents;
while the second rule repository is being retrieved, continuing to process the near-continuous series of real-time communications within the first queue using the first rule repository;
verifying that the second rule repository has been received;
in response to verifying that the second rule repository has been received, switching routing of the real-time data stream to a second queue associated with the second rule repository;
in response to switching routing of the real-time data stream to the second queue, processing a first portion of the near-continuous series of real-time communications in the first queue with the first rule repository and, a second portion of the near-continuous series of real-time communications in the second queue using the second rule repository;
determining that the first portion of the near-continuous series of real-time communications has been processed; and
in response to determining that the first portion of the near-continuous series of real-time communications has been processed, setting a flag on the first rule repository that disables the first rule repository.

2. The system of claim 1, wherein the instructions further cause the one or more processors to, prior to switching routing of the real-time data stream to the second queue, authenticate the second rule repository using metadata associated with the second rule repository.

3. The system of claim 1, wherein the instructions further cause the one or more processors to:
prior to switching routing of the real-time data stream to the second queue:
transmit one or more synthetic requests to the second rule repository; and
validate the second rule repository based on responses from the second rule repository to the one or more synthetic requests.

4. The system of claim 1, wherein the instructions further cause the one or more processors to perform the operations comprising:
determining that a number of requests rejected based on processing the near-continuous real-time communications using the second rule repository exceeds a threshold; and
in response to determining that the number of requests rejected based on processing the near-continuous real-time communications using the second rule repository exceeds the threshold, performing a roll-back operation to the first rule repository.

5. A method comprising:
receiving a real-time data stream, the real-time data stream comprising a near-continuous series of real-time communications requiring cybersecurity verification;
routing the real-time data stream to a first queue associated with a first rule repository, wherein the first rule repository comprises a complete rule set for addressing known cybersecurity incidents;
in response to determining that rule updates to rules within the first rule repository are available, retrieving a second rule repository, wherein the second rule repository comprises a revised complete rule set for addressing the known cybersecurity incidents;

based on completion of retrieval of the second rule repository:

switching routing of the real-time data stream to a second queue associated with the second rule repository;

in response to switching routing of the real-time data stream to the second queue, processing a first portion of the near-continuous series of real-time communications within the first queue using the first rule repository, and a second portion of the near-continuous series of real-time communications in the second queue using the second rule repository; and determining that the first portion of the near-continuous series of real-time communications has been processed; and in response to determining that the first portion of the near-continuous series of real-time communications has been processed, disabling the first rule repository.

6. The method of claim 5, further comprising, prior to switching routing of the real-time data stream to the second queue, authenticating the second rule repository using metadata associated with the second rule repository.

7. The method of claim 5, further comprising:

prior to switching routing of the real-time data stream to the second queue transmitting one or more synthetic requests to the second rule repository; and validating the second rule repository based on responses from the second rule repository to the one or more synthetic requests.

8. The method of claim 5, further comprising:

determining that a number of requests rejected based on processing the near-continuous real-time communications using the second rule repository exceeds a threshold; and in response to determining that the number of requests rejected based on processing the near-continuous real-time communications using the second rule repository exceeds the threshold, performing a roll-back operation to the first rule repository.

9. The method of claim 5, further comprising:

determining that a criterion for querying for a rule update has been met;

querying a remote data source for the rule update based the criterion; and determining, based on results of querying the remote data source, that the rule update is available.

10. The method of claim 9, wherein determining that the criterion for querying the rule update has been met:

determining whether a size of an incoming request of a plurality of incoming requests has exceeded a size threshold;

determining whether a volume of the plurality of incoming requests has exceeded a volume threshold; and based on determining that the size of the incoming request has exceeded the size threshold or the volume of the plurality of incoming requests has exceeded the volume threshold, determining that the criterion for querying the rule update has been met.

11. The method of claim 9, wherein determining that the criterion for querying the rule update has been met:

determining that a rate of change of incoming requests has exceeded a rate threshold; and based on determining that the rate of change of incoming requests has exceeded the rate threshold, determining that the criterion for querying the rule update has been met.

12. The method of claim 5, further comprising:

detecting a new cybersecurity incident; and generating a third rule repository based on the new cybersecurity incident.

13. A non-transitory, computer-readable medium storing instructions for updating cybersecurity enforcement rules in real-time over disparate computer networks, when executed by one or more processors, cause the one or more processors to perform operations comprising:

receiving a real-time data stream, the real-time data stream comprising a near-continuous series of real-time communications requiring cybersecurity verification;

routing the real-time data stream to a first queue associated with a first rule repository, wherein the first rule repository comprises a complete rule set for addressing known cybersecurity incidents;

in response to determining that rule updates to rules within the first rule repository are available, retrieving a second rule repository, wherein the second rule repository comprises a revised complete rule set for addressing the known cybersecurity incidents;

based on completion of retrieval of the second rule repository:

switching routing of the real-time data stream to a second queue associated with the second rule repository;

in response to switching routing of the real-time data stream to the second queue, processing a first portion of the near-continuous series of real-time communications within the first queue using the first rule repository, and a second portion of the near-continuous series of real-time communications in the second queue using the second rule repository; and determining that the first portion of the near-continuous series of real-time communications has been processed; and in response to determining that the first portion of the near-continuous series of real-time communications has been processed, disabling the first rule repository.

14. The non-transitory, computer-readable medium of claim 13, wherein the instructions further cause the one or more processors, prior to switching routing of the real-time data stream to the second queue authenticate the second rule repository using metadata associated with the second rule repository.

15. The non-transitory, computer-readable medium of claim 14, wherein the instructions further cause the one or more processors, prior to switching routing of the real-time data stream to the second queue, to perform operations comprising:

transmitting one or more synthetic requests to the second rule repository; and validating the second rule repository based on responses from the second rule repository to the one or more synthetic requests.

16. The non-transitory, computer-readable medium of claim 13, wherein the instructions further cause the one or more processors to perform operations comprising:

determining that a number of requests rejected based on processing the real-time communication data using the second rule repository exceeds a threshold; and in response to determining that the number of requests rejected based on processing the real-time communication data using the second rule repository exceeds the threshold, performing a roll-back operation to the first rule repository.

17. The non-transitory, computer-readable medium of claim 13, wherein the instructions further cause the one or more processors to perform operations comprising:
   determining that a criterion for querying for a rule update has been met;
   querying a remote data source for the rule update based the criterion; and
   determining, based on results of querying the remote data source, that the rule update is available.

18. The non-transitory, computer-readable medium of claim 17, wherein the instructions for determining that the criterion for querying the rule update has been met further cause the one or more processors to perform operations comprising:
   determining whether a size of an incoming request of a plurality of incoming requests has exceeded a size threshold;
   determining whether a volume of the plurality of incoming requests has exceeded a volume threshold; and
   based on determining that the size of the incoming request has exceeded the size threshold or the volume of the plurality of incoming requests has exceeded the volume threshold, determining that the criterion for querying the rule update has been met.

19. The non-transitory, computer-readable medium of claim 17, wherein the instructions for determining that the criterion for querying the rule update has been met further cause the one or more processors to perform operations comprising:
   determining that a rate of change of incoming requests has exceeded a rate threshold; and
   based on determining that the rate of change of incoming requests has exceeded the rate threshold, determining that the criterion for querying the rule update has been met.

20. The non-transitory, computer-readable medium of claim 19, wherein the instructions further cause the one or more processors to perform operations comprising:
   detecting a new cybersecurity incident; and
   generating a third rule repository based on the new cybersecurity incident.

* * * * *